United States Patent
Brady

(10) Patent No.: US 7,958,719 B2
(45) Date of Patent: Jun. 14, 2011

(54) NONCIRCULAR TRANSIENT FLUID FUEL INJECTOR CONTROL CHANNELS IN PROPELLANT INJECTOR COMBUSTION SYSTEMS

(75) Inventor: Brian Blaise Brady, Seal Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 1112 days.

(21) Appl. No.: 11/729,331

(22) Filed: Mar. 28, 2007

(65) Prior Publication Data
US 2008/0236140 A1 Oct. 2, 2008

(51) Int. Cl.
*F02K 9/00* (2006.01)
(52) U.S. Cl. ............................................. 60/257; 60/734
(58) Field of Classification Search .................... 60/257, 60/258, 259, 260, 734; 239/127.1, 127.3
See application file for complete search history.

(56) References Cited

U.S. PATENT DOCUMENTS

| | | | | | |
|---|---|---|---|---|---|
| 2,476,185 | A | * | 7/1949 | Goddard | 60/260 |
| 2,709,887 | A | * | 6/1955 | Goddard | 60/258 |
| 3,190,070 | A | * | 6/1965 | Neu | 60/267 |
| 3,423,942 | A | * | 1/1969 | Spindler | 60/207 |
| 4,894,986 | A | * | 1/1990 | Etheridge | 60/258 |
| 7,640,726 | B2 | * | 1/2010 | Fang et al. | 60/204 |

* cited by examiner

*Primary Examiner* — Louis Casaregola
(74) *Attorney, Agent, or Firm* — K & L Gates LLP

(57) ABSTRACT

A fuel injector system for combustion engines and motors, such as pulsed bipropellant thrusters, includes noncircular fuel and oxidizer injectors at the ends of respective dribble channels for controlling the mixture ratio of the propellants passing into a combustion chambers for maintaining a desire or ideal mixture ratio as determined by the cross-sectional area of the injectors well suited for pulse combustion fuel injector systems.

15 Claims, 1 Drawing Sheet

PROPELLANT INJECTOR SYSTEM

PROPELLANT INJECTOR SYSTEM

PROPELLANT MASS FLOW

NONCIRCULAR TRANSIENT FLUID FUEL INJECTOR CONTROL CHANNELS IN PROPELLANT INJECTOR COMBUSTION SYSTEMS

FIELD OF THE INVENTION

The invention relates to the field of combustion engines and motors. More particularly, the present invention relates to sizing of fuel and oxidizer dribble channels for improved propellant injection and combustion.

BACKGROUND OF THE INVENTION

In-space propulsion is an important part of most space missions, accounting for an average of 40% of the launched mass of unmanned systems. Pulsed bipropellant thrusters are commonly used on spacecraft for in-space propulsion. Short-pulse operation is particularly useful for attitude control, the figure of merit being the minimum impulse bit. Propellant consumption in limit cycle operations is particularly sensitive to the minimum impulse bit. A rough estimate of the size of the minimum impulse bit of a thruster is the steady state force generated times the pulse width, but significant deviations from this concept are found experimentally. Pulse widths as short as 0.01 s are used operationally. The efficiency of pulsed bipropellants has been estimated as 50% of the theoretical limit for 0.01 s pulses, rising to 75%-85% for 0.1 s pulses. This can be compared to a typical steady state efficiency of 92% of theoretical. In addition to the reduced efficiency of pulsed mode operation, there is also an increased variability. The thrust can vary by 10% from pulse to pulse, or ±30% from engine to engine.

Incomplete combustion of pulsed bipropellant thrusters and can lead to condensed phase reaction intermediates that can contaminate spacecraft surfaces, and even cause erosion. These contaminants are usually seen on start-up or shutdown, and there is a correlation between the amount of contaminant formed, and the amount the specific impulse of the pulsed mode is reduced. In some cases, the reaction intermediates formed in incomplete combustion can lead to hard-starts, or engine damage.

There are several reasons for the differences between steady state and pulsed operation. The start-up of a thruster on-orbit is significantly different from the steady state operation. The combustion chamber is under vacuum and cold, and the propellant lines from the thruster valve through the injector are also under vacuum. Just the difference in temperature is enough to cause significant differences in the flow field. Other differences compound the effect. The time required for ignition, and the establishment of steady state combustion chamber pressure and temperature is relatively short compared to typical thruster burns. For a short pulse meant to deliver the minimum impulse bit, however, the combustion chamber may never reach steady state conditions within the pulse. Incomplete combustion could be one of the factors contributing to the low efficiency and high variability of pulsed thrusters, as well as the generation of contaminants. An additional potential concern is the freezing of propellant on exposure to space vacuum.

The hydraulic diameter of dribble channels and injectors affect propellant flow properties of injector channels of bipropellant thrusters. The dribble channels are used to synchronize the response times of the fuel and oxidizer. The synchronization of the propellant response times allows the mixture ratio to be controlled over all burn times. Bipropellant engines are used for multiple purposes on spacecraft. These purposes include orbit insertion, orbit trim, plane changes, repositioning, station keeping, attitude control, maneuvering, reaction wheel unloading, and thrust vector control. Pulsed bipropellant engines are most often used in attitude control. The performance of pulsed bipropellant engines is judged by the specific impulse, $I_{SP}$, and the minimum impulse bit, $I_{MIN}$. In limit cycle operations, for example, where a pair of thrusters are used to keep the attitude of the spacecraft within a set angular range, the propellant usage $W_P$ is very sensitive to $I_{MIN}$. A $W_P$ usage equation is defined by $W_P = n^2(I_{MIN})^2 L / 4 I_{SP} I_V \theta_L$, where n is the number of motors firing, L is the radius from the vehicle center of mass to the thrust vector, $I_V$ is the mass moment of inertia of the vehicle, $\theta_L$ is the angular limit, or one half the allowed coasting angle between firings. A smaller $I_{MIN}$ could reduce propellant usage or alternatively be used to provide tighter angular control at the same propellant consumption rate. $I_{MIN}$ is set by the minimum pulse width $I_{SP}$, and the way the engine responds to the short pulse of propellant. Current bipropellant thrusters have an $I_{MIN}$ of 0.09 N-s for a 20.0 ms pulse. The $I_{SP}$ in short 20.0 ms pulses is about half that at steady state. 100 ms pulses have about three-quarters the $I_{SP}$ of steady state firings. The variability of $I_{MIN}$ is about 10% from pulse to pulse and 30% from engine to engine.

Monopropellant engines have lower $I_{MIN}$, but also a lower $I_{SP}$. For missions where the required total impulse is less than 45,000 N-s monopropellant systems are used because the propellant savings does not justify the increased complexity. Monopropellant systems usually use hydrazine, whereas bipropellant systems usually use monomethyl hydrazine and nitrogen tetroxide. An alternate design is the dual mode system, which uses hydrazine and nitrogen tetroxide in a bipropellant engine for orbit insertion and other large velocity change propulsion requirements. The hydrazine in these systems can then be used for monopropellant engines for attitude control. The use of these systems highlights the need for a good, pulsed bipropellant engine.

Standard bipropellant injector design uses a single valve to control the flow of both the fuel and oxidizer. The propellant line between the thruster valve and the injector orifice is called the dribble volume. The dribble volume in a dribble channel is kept small to minimize start up time, but needs to be large enough to limit soak back of heat from the combustion chamber. The dribble volume consists of a feed tube, that is, a dribble channel, and an injector orifice, or simply, an injector. The injector orifice is a smaller diameter hole or tube terminating on the injector face. Fuel and oxidizer are injected into the combustion chamber through an equal number of circular orifices. The injector orifices are sized to achieve the desired mass flow ratio of oxidizer to fuel, the mixture ratio, for steady state operation. To facilitate start up of the thruster, the oxidizer dribble volume is smaller, allowing the oxidizer to reach the combustion chamber first.

Discovery by the present inventor is made of an unknown problem that an initial propellant flow or the flow during a short pulse of the thruster valve can be much slower than the steady state value. The response time of the propellant flow is limited by inertia and viscous drag. The response time of a particular propellant is given by a response time equation $\tau = \rho \alpha / \mu$, where $\tau$ is the response time, $\rho$ is the density, $\alpha$ the hydraulic radius, and $\mu$ is the viscosity. For current injector designs, the response time of the oxidizer flow is three or four times longer than the response time of the fuel flow, and both response times are many times the length of the shortest pulses typically used on orbit. The mismatch in the response times of the propellant flows means that for short pulses, and during the initial phases of steady state operation, the propellant mixture ratio will be extremely fuel rich. The few millisecond oxidizer lead provided by a smaller oxidizer dribble volume in the current designs is not enough to compensate for this mismatch.

The fuel rich mixture results in lower combustion temperatures, and incomplete combustion, which causes several problems. Incomplete combustion can lead to the accumulation of combustion intermediates. These intermediates are often called fuel oxidizer reaction products. The fuel oxidizer reaction products produce undesirable high-energy condensation. The products have been linked to several problems with thrusters, such as hard starts, and even damage to the thruster body. The fuel oxidizer reaction products can also contaminate other spacecraft surfaces where there is a lower vapor pressure than fuel, oxidizer, or combustion products. Low chamber temperatures make fuel oxidizer reaction product accumulation more likely. Incomplete combustion and the accumulation of fuel oxidizer reaction products are responsible for the low $I_{SP}$ and high variability of the $I_{MIN}$ in pulsed operation. The accumulation of fuel oxidizer reaction products and impacts on engine operation have limited the minimum pulse length used in bipropellant engines, and thus the $I_{MIN}$.

Unequal propellant response times can also lead to combustion instability. Normally, propellant flow is believed to have a damping effect on pressure oscillations. When the pressure in the combustion chamber spikes up due to some perturbation, the propellant flow will decrease due to the reduced pressure drop from the tank to the combustion chamber. The reduced propellant flow will lead to a lower chamber pressure countering the effect of the perturbation. When, however, the fuel and oxidizer flows respond to the pressure fluctuation on different time scales, the pressure spike can be amplified.

Bipropellant engines usually run fuel rich. The rich mixture ratio keeps the combustion chamber temperature lower with the excess fuel being used to cool the chamber walls. The excess fuel lowers the average mass of the exhaust gas for yielding a slightly higher exhaust velocity. When the fuel flow responds more quickly to a positive pressure fluctuation, there is a shift in the mixture ratio closer to stoichiometric. The stoichiometric mixture burns hotter, and causes a larger pressure increase, amplifying the fluctuation. Synchronization of the propellant response times will prevent shifts in the mixture ratio, and lead to damping of pressure fluctuations, and more stable combustion. Prior propellant injector systems have used conventional dribble channels and injectors producing mismatches in fuel and oxidizer delivery, contamination, and spikes in the combustion performance. These and other disadvantages are solved or reduced using the invention.

SUMMARY OF THE INVENTION

An object of the invention is to improve the efficiency of bipropellant combustion systems.

Another object of the invention is to provide noncircular injector orifices for controlling the combustion of bipropellant combustion systems.

Yet another object of the invention is to provide noncircular injector orifices in one or both of the fuel or oxidizer fluid flows for controlling the combustion of bipropellant combustion systems.

Still another object of the invention is to provide noncircular injectors in one or both of the fuel or oxidizer fluid flows for controlling propellant fluid flow for combustion by bipropellant combustion systems The invention is directed to modifying the cross-sectional area of propellant injectors. The injector orifices are shaped to insure that the design mixture ratio, which is achieved in steady state operation, is also achieved in the shortest burn times. At least one of the injectors is noncircular or the number of fuel and oxidizer channels is unequal to achieve synchronized flow response. Alternatively, the injectors can be shaped to implement a hotter mixture ratio for short burn times that will achieve design thrust levels more quickly, while still delivering the design mixture ratio for longer burns. The synchronization of propellant response times also allows the reduced flow in short pulse operation of the bipropellant thruster to be used to throttle the thruster over a wide range without damaging the engine or contaminating the spacecraft with the products of incomplete combustion. These and other advantages will become more apparent from the following detailed description of the preferred embodiment.

DETAILED DESCRIPTION OF THE PREFERRED EMBODIMENT

Figure 1:
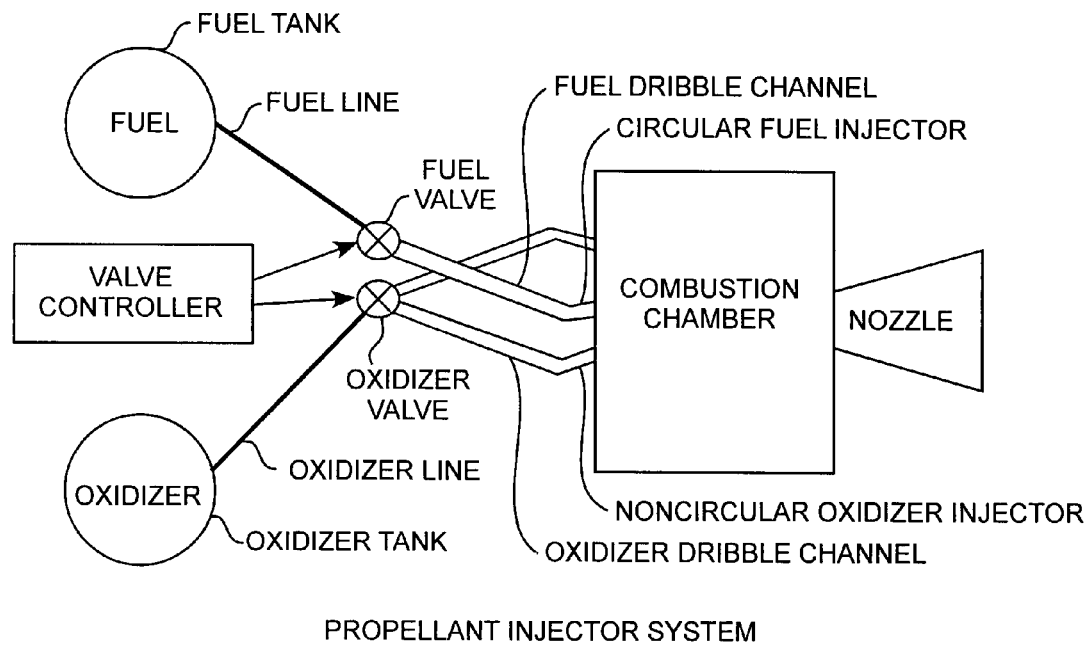
FIG. 1 is a block diagram of a propellant injector system.
Figure 2:
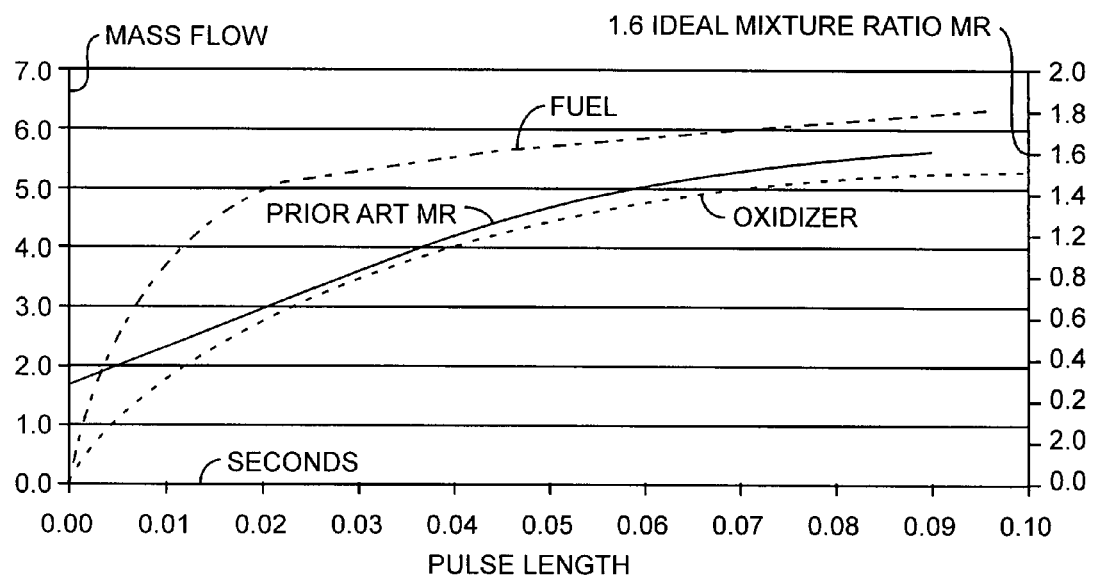
FIG. 2 is a performance plot of propellant mass flow.

An embodiment of the invention is described with reference to the figures using reference designations as shown in the figures. Referring to FIG. 1, a fuel tank is used to store and contain liquid fuel and pressurant gas. A fuel line extends from the fuel tank to a fuel valve for controlling fuel flow from the fuel line into a fuel dribble channel. The dribble channel, in the preferred form, is a circular fuel channel connected between the fuel valve and a combustion chamber. The fuel passes from the tank to combustion chamber as limited by the fuel valve, the fuel dribble channel, and fuel injector. In the preferred form, the fuel injector is circular fuel injector orifice. A valve controller controls the fuel valve to control the flow of fuel from the fuel tank to the combustion chamber under system controls. The injector orifice, that is the circular fuel injector, is the last portion of the fuel line extending between the fuel valve and the combustion chamber. The last portion of the dribble channel is the circular fuel injector. The circular fuel injector controls the amount and acceleration of liquid fuel flow into the combustion chamber. The cross-sectional area of the circular injector channel limits and controls the amount of fuel flow and the shape controls the acceleration of fuel flow. The circular cross-section corresponds to the lowest acceleration of fuel flow for a given channel area.

An oxidizer tank contains a liquid oxidizer and a pressurant gas. An oxidizer line provides a conduit for the oxidizer from the oxidizer tank to the combustion chamber. An oxidizer valve controls the flow of oxidizer from the oxidizer tank to the combustion chamber. The valve controller opens and closes the fuel valve and the oxidizer valve simultaneously in response to system commands for thrust out of a nozzle coupled to the combustion chamber. The fuel valve communicates the oxidizer from the oxidizer line into an oxidizer dribble channel. An oxidizer noncircular injector is the last portion of the oxidizer line between the oxidizer tank and the combustion chamber. The oxidizer dribble channel, in the preferred form, includes at least a portion that is a noncircular oxidizer injector. The oxidizer injector controls the amount and the acceleration of liquid oxidizer flow into the combustion chamber. The cross-sectional area of the oxidizer injector controls the amount of oxidizer flow. The cross-sectional shape also controls the acceleration of the oxidizer flow into the combustion chamber. The noncircular cross-section corresponds to a higher acceleration for a given channel area. The oxidizer injector is shaped so that the oxidizer, which has a higher density than the fuel, accelerates at a rate relative to the fuel that maintains the proper mixture ratio (MR). The combustion chamber burns a mixture of the fuel and the oxidizer to provide hot exhaust gases that are ejected out of the nozzle. The nozzle provides a channel for hot exhaust gases to leave the combustion chamber for efficiently converting thermal energy of combustion of the fuel and oxidizer into kinetic energy and momentum under system controls of the valve controller. The mass flow and mixture ratio can be varied by the changing cross-sectional area of the fuel and oxidizer injectors or by adding additional parallel channels and injectors for increasing mass flow provided that at least one of the injectors has a noncircular cross-sectional area. As shown, the preferred form includes two oxidizer injectors. Any number of fuel and oxidizer injectors can be used with differing cross-sectional area as long as one of which is noncircular. In the preferred form, the single fuel injector is circular and the two oxidizer injectors are noncircular in cross-section.

Referring to both of the Figures, by adjusting the shape of the injector orifices, a 1.6 ideal mixture ratio MR can be achieved over various pulse widths including short pulses. The fuel and oxidizer mass flow synchronously rise together. The noncircular injectors synchronize the response time of the propellants in the injector of a bipropellant thruster. The response of a fluid to transient conditions is controlled by inertia and viscous drag. The response time is calculated from the propellant density, the hydraulic radius, and the viscosity. The simplest way to synchronize the response time of two propellants is to use the hydraulic diameter to compensate for differences in density and viscosity. The ratio of the area of the oxidizer injector to fuel injector must be conserved so that when full flow is reached in steady state operation, the proper mixture ratio is achieved. For example, when multiple circular oxidizer injectors are used for each fuel dribble channel, the response times can be matched for each propellant while keeping the total injector orifice area at the design ratio. There are really two response times that must be synchronized. The response time of the dribble channel and the response time of the injector orifice. The dribble channel fluid flow controls synchronization while maintaining a mixture ratio in steady state operation.

The use of a noncircular injector can allow the $I_{MIN}$ to be decreased in two ways. First, the pulse width can be decreased. Pulsed valves with response times on the order of a few milliseconds are available, and have been used on orbit. Pulses less than 20 ms in length are rarely used in operation. In addition, the reduced flow of propellant at times shorter than the response time can be used to reduce the delivered impulse further. For example, when the response time is ten times the valve pulse length, the propellant flow during the pulse will only be 25% of the steady state value. The response time of the dribble channel and injector orifice can be designed to achieve reduced flow. The slow response time is compatible when the fuel and oxidizer flow remain balanced. Combustion chamber overheating is reduced for short pulse operation. Designing a shorter oxidizer response time into the injector can allow short pulses to run hotter than the steady state engine. Because most engines normally run fuel rich, a faster oxidizer response time would make short pulses closer to stoichiometric, releasing more heat. The mixture ratio would return to the fuel rich design mixture for pulses on the order of 100 ms or longer.

The propellant injector system is shown with an equal number of fuel channels to oxidizer channels. An unequal number of circular channels can be made to function equivalently to the use of at least one noncircular channel so as to maintain the synchronized flow of the propellants. Any number of unequal channels can be used as an alternate solution, which uses different numbers of circular channels to accomplish the same effect of synchronized flow. For example, one large oval shaped fuel channel could be replaced with four smaller fuel channels. It is the ratio of the wall, or circumference of the orifice to the area that controls the propellant acceleration. The synchronized flow can be controlled by using only one noncircular channel. Several smaller circular channels could equivalently provide the same flow rate. Two circular channels, each half the area of a larger channel will have a greater total circumference.

The average thrust of the bipropellant engine can also be varied by taking advantage of the reduced propellant flow at times shorter than the response time. For example, if the propellant response time is 100 ms, a 10 ms pulse will deliver a flow rate that is about 30% of the steady state flow rate. In a series of 10 ms pulses, the flow will stop and restart, never reaching the steady state flow rate. A series of 10 ms pulses with 20 ms off time will deliver an average thrust that is 10% of the steady state value. This method of throttling the thrust output is simpler than in current designs. By synchronizing the response times of the propellants the invention will improve the start up and short pulse operation of bipropellant thrusters. The balanced flow will result in higher chamber temperatures and complete combustion, avoiding the formation and accumulation of potentially damaging fuel oxidizer reaction products, and the contamination of adjacent spacecraft surfaces. The improved operation will allow use of shorter pulses, resulting in a smaller, more reproducible minimum impulse bit. This will result in smoother operations, propellant savings, and more precise spacecraft control. This injector design can take advantage of the reduced flow of propellant at times shorter than the response time to create an engine with an even smaller minimum impulse bit, and whose thrust can be throttled over a wide range.

The thrusters can operate in a stable steady state because one of the sources of combustion instability has been removed and is useful in small bipropellant thrusters. The thrusters are typically used for trajectory corrections, attitude control, and station keeping. By choosing an injector with a shorter oxidizer response time, it should even be possible to run the thruster closer to a stoichiometric mixture ratio for short pulses or the beginning of longer burns, and have the thruster run at the design mixture ratio as the pulses lengthen. The higher heat release of the stoichiometric mix would bring the combustion chamber to stable operating conditions more quickly, and inhibit the formation and accumulation of combustion intermediates.

The reduced flow at times shorter than the response time could be utilized to extend the dynamic range of the thruster. The impulse delivered by a short pulse has been estimated as the steady state thrust times the pulse width. If the propellant velocity never reaches the steady state velocity during a pulse, however, as in the measurements done here, then the impulse is reduced. If a series of pulses is used, such that the propellant mass flow rate stays low during each pulse, then the thruster can effectively be throttled over a thrust range. The duty factor of the pulse train would reduce the average thrust even more on the low end.

Injector design involves balancing competing effects. To diminish the impact of the start transient most injector designs try to minimize the volume of the propellant line between the thruster valve and the injector orifice, the dribble volume. This will reduce the time from the command signal to ignition and thrust. At the same time, the distance between the combustion chamber and the thruster valve needs to be large enough to prevent soak back of heat from the chamber damaging the valve using larger dribble volumes. The pressure drop from the thruster valve to the combustion chamber can be reduced. Pressure drop reduction is important for steady state operation when the combustion chamber is at high pressure and the propellants need to be at a higher pressure to be injected. This is accomplished by using a relatively large diameter for most of the dribble volume, and a thin injector orifice of smaller cross-sectional area. In this way, most of the pressure drop occurs across the injector orifice. Another strategy to diminish startup effects is to force one propellant to lead the other by making one of the dribble volumes relatively smaller. An oxidizer lead is usually chosen to be smaller. Small oxidizer dribble volumes would have the effect of moving the oxidizer curve performance a few milliseconds earlier with a slight increase in the mixture ratio. Although this approach is satisfactory for steady state operation, a string of short pulses may still yield a very rich mixture.

A small diameter dribble volume will give the fastest response time with the shortest delay from command signal to ignition and thrust. Small diameter lines lead to large pressure drops which adversely affect steady state operation. However, long response times are acceptable as long as the times are similar for both propellants. The reduced flow at times may be short as compared to the response time that may be used to provide designed low thrust levels. The propellants will reach the combustion chamber together, allowing ignition, combustion, and high chamber temperatures and pressures for providing highly reproducible thrust without accumulation of incomplete combustion products. Propellants generally do not reach steady state injection velocities on a time scale comparable to the duration of short pulses used in many bipropellant thrusters. In addition, commonly used fuels reach their rated flow more quickly than the oxidizer. The fuel rich mixtures seen in short pulses, and especially strings of short pulses, could lead to problems with pulsed bipropellant thrusters. Injector designs that account for the transient flow properties could avoid these problems, and may even have some other advantages, for example, increasing the operable range of bipropellant thrusters. Propellants can be delivered and reach steady state injection velocities on a time scale comparable to the duration of short pulses used in many bipropellant thrusters. Those skilled in the art can make enhancements, improvements, and modifications to the invention, and these enhancements, improvements, and modifications may nonetheless fall within the spirit and scope of the following claims.

What is claimed is:

1. An injector system for use in a bipropellant thruster having a combustion chamber combusting propellants, the system comprising,
    a fuel source providing a fuel,
    an oxidizer source providing an oxidizer,
    a fuel channel for communicating the fuel from the fuel source to the combustion chamber, and
    an oxidizer channel for communicating the oxidizer from the oxidizer source to the combustion chamber,
    wherein,
    the fuel channel has a circular cross-sectional shape; and
    the oxidizer channel has a non-circular cross-sectional shape.

2. The system of claim 1 wherein, the bipropellant thruster is a pulsed bipropellant thruster.

3. The system of claim 1 further comprising,
    a fuel valve for controlled communication of the fuel from the fuel source into the fuel channel, and
    an oxidizer valve for controlled communication of the oxidizer into the oxidizer channel.

4. The system of claim 3 wherein, the bipropellant thruster is a pulsed bipropellant thruster, and wherein the fuel valve and oxidizer valve are pulsed for pulsing the fuel and oxidizer into the combustion chamber.

5. The system of claim 4 wherein, a pulse length of the thruster is less than twenty milliseconds.

6. The system of claim 1 wherein, the fuel is monomethyl hydrazine fuel, and the oxidizer is nitrogen tetroxide.

7. The system of claim 1 wherein, the fuel channel comprises a fuel dribble channel and a fuel injector, and the oxidizer channel comprises an oxidizer dribble channel and an oxidizer injector.

8. The system of claim 7 wherein, the bipropellant thruster is a pulsed bipropellant thruster, and further comprising:
    a fuel valve for controlling communication of the fuel from the fuel source into the fuel channel, and
    an oxidizer valve for controlling communication of the oxidizer into the oxidizer channel, wherein the fuel valve and oxidizer valve are pulsed for pulsing the fuel and oxidizer into the combustion chamber, where a pulse length of the thruster is less than twenty milliseconds.

9. The system of claim 8 wherein, the fuel dribble channel and the oxidizer dribble channel are for maintaining a mixture ratio in a steady state operation of the thruster.

10. The system of claim 8 wherein, the fuel injector and the oxidizer injector are for maintaining synchronized mass flow of the fuel and the oxidizer to maintain a steady state mixture ratio during pulsed combustion.

11. An injector system for use in a bipropellant thruster having a combustion chamber combusting propellants, the system comprising,
    a fuel source providing a fuel,
    an oxidizer source providing an oxidizer,
    one or more fuel channels for communicating the fuel from the fuel source to the combustion chamber, wherein the one or more fuel channels have a circular cross-sectional shape, and
    two or more oxidizer channels for communicating the oxidizer from the oxidizer source to the combustion chamber, wherein the two or more oxidizer channels have a non-circular cross-sectional shape, and, wherein the two or more oxidizer channels comprise more channels than the one or more fuel channels.

12. The system of claim 11 wherein the one or more fuel channels consist of one fuel channel.

13. The system of claim 11 wherein, the bipropellant thruster is a pulsed bipropellant thruster.

14. The system of claim 11, wherein a sum of the cross-sectional areas of the one or more fuel channels is substantially equal to a sum of the cross-sectional areas of the two or more oxidizer channels.

15. The system of claim 1, wherein a cross-sectional area of the fuel channel is substantially equal to a cross-sectional area of the oxidizer channel.

* * * * *